United States Patent [19]

Shimizu

[11] Patent Number: 5,061,739

[45] Date of Patent: Oct. 29, 1991

[54] ROOM TEMPERATURE CURING COMPOSITIONS

[75] Inventor: Chiyuki Shimizu, Ohta, Japan

[73] Assignee: Toshiba Silicone Co., Ltd., Japan

[21] Appl. No.: 435,235

[22] Filed: Nov. 13, 1989

[30] Foreign Application Priority Data

Nov. 16, 1988 [JP] Japan .................................. 63-289240

[51] Int. Cl.$^5$ ................................................ C08K 9/06
[52] U.S. Cl. ...................................... 523/213; 523/209; 523/212; 524/788; 524/786; 524/789; 524/785; 524/860; 524/863; 524/868; 524/874; 525/476; 525/477
[58] Field of Search ................ 525/476, 477; 523/209, 523/212, 213; 524/788, 789, 786, 785, 860, 863, 868, 874

[56] References Cited

U.S. PATENT DOCUMENTS 4,474,930 10/1984 Mikami et al. ...................... 525/476
4,657,986 4/1987 Isayama et al. ...................... 525/476

Primary Examiner—Melvyn I. Marquis

[57] ABSTRACT

A room temperature curing composition comprising:
(A) a silanol-terminated polydiorganosiloxane;
(B) a hydrolyzable silyl-terminated polymer obtained by reacting:
 (a) an epoxy-terminated polyether;
 (b)(i) an heterocyclic compound containing imino groups, and/or;
 (ii) an aromatic compound or a heterocyclic compound containing mercapto groups; and,
 (c) an organosilicon compound containing an epoxy group and a hydrolyzable group;
(C) an inorganic filler; and,
(D) a curing catalyst.

5 Claims, 1 Drawing Sheet

ROOM TEMPERATURE CURING COMPOSITIONS

Patent Application of Chiyuki Shimizu

The present application claims the priority of Japanese Patent Application Serial No. 63-289240 filed on Nov. 16, 1988.

FIELD OF THE INVENTION

The present invention relates to room temperature curing compositions. More particularly the present invention relates to room temperature curing compositions which are useful for sealants in the construction field and are which free from peripheral staining.

BACKGROUND OF THE INVENTION

A variety of materials are known as so-called room temperature curing type silicone rubbers that are cured at room temperature and converted into rubbery elastic materials. These room temperature curing silicone rubbers have excellent weatherability, durability, heat resistance and freeze resistance. Because of this, these silicone rubbers are increasing used as joint sealants in the gaps between the outer walls of buildings.

However, conventional silicone sealants involve a problem in that the polyorganosiloxane, as the main component, exudes around the joints and dust in the air adheres thereto causing them to stain.

In order to solve the problem, there is proposed a method which comprises incorporating a surface active agent containing a polyoxyethylene group, a sorbitan residue or a disaccharide residue into silicone sealants (Japanese Unexamined Patent Application Laid-Open Nos. 56-76452 and 56-76453), or, alternatively, a method which comprises incorporating a surface active agent containing a fluorine atom (Japanese Unexamined Patent Application Laid-Open Nos. 58-167647 and 61-34062). However, these methods encounter a problem in that the durability of the anti-staining effect does not last very long.

SUMMARY OF THE INVENTION

As a result of various investigations on a method for preventing sealant compositions comprising polydiorganosiloxane as the main component from staining, especially on a method for making the anti-staining effect durable, the present inventor has come to accomplish the present invention.

That is, the present invention relates to a room temperature curing composition comprising:

(A) 100 parts by weight of a silanol-terminated polydiorganosiloxane (the terminals are blocked with silanol groups) having a viscosity at 25° C. of 100 to 200,000 cSt;

(B) 5 to 100 parts by weight of a hydrolyzable silyl-terminated polymer (the terminals are blocked with silyl groups) obtained by reacting:

(a) an epoxy-terminated polyether (the terminals are blocked with epoxy groups) represented by general formula:

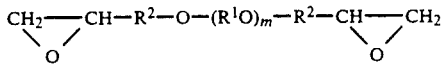

wherein $R^1$ and $R^2$ each represents a divalent hydrocarbon group and m represents a number of 10 to 500;

(b)(i) a heterocyclic compound containing two imino groups bonded to two different carbon atoms in the molecule thereof, and/or;

(ii) an aromatic compound or a heterocyclic compound containing two mercapto groups bonded to carbon atoms constituting the aromatic ring or hetero ring; and, (c) an organosilicon compound containing an epoxy group and a hydrolyzable group;

(C) 3 to 300 parts by weight of an inorganic filler based on 100 parts by weight of (A) and (B) in total; and, (D) 0.001 to 20 parts by weight of a curing catalyst based on 100 parts by weight of (A) and (B1, in total.

DETAILED DESCRIPTION OF THE INVENTION

Figure 1:
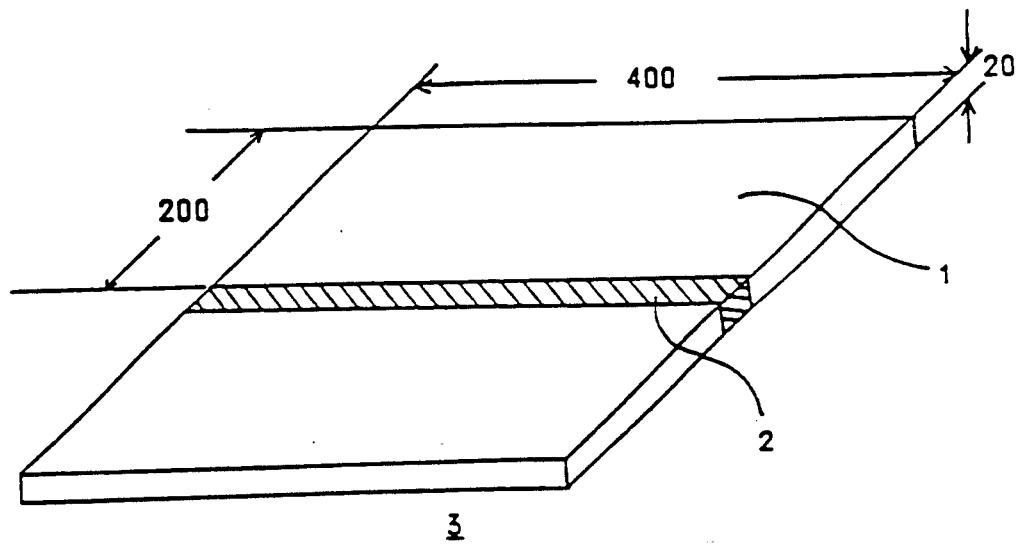
FIG. 1 shows a specimen used in the outdoor exposure test.
Figure 2:
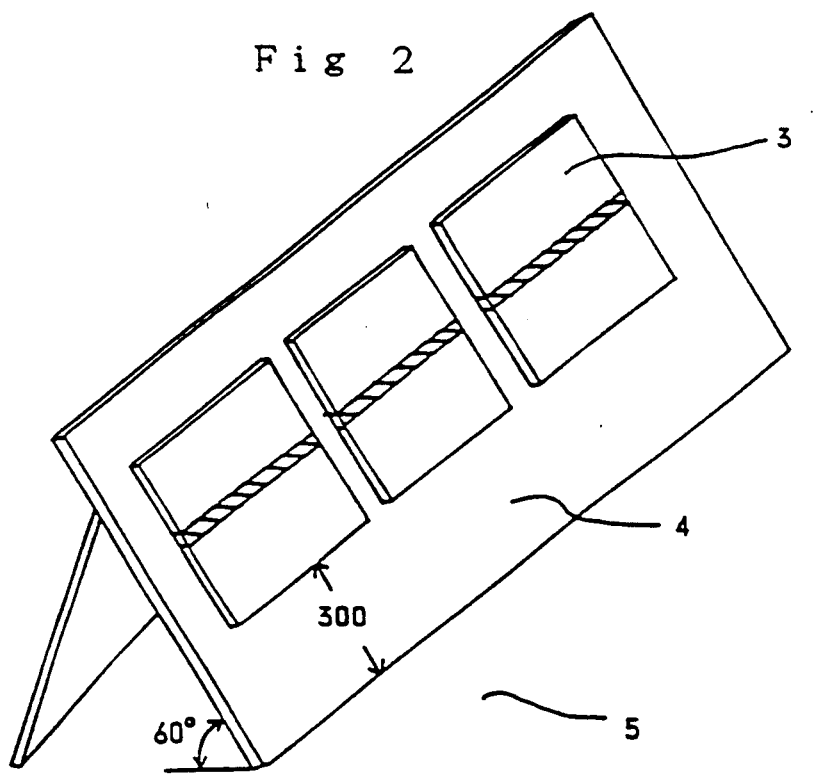
FIG. 2 shows a method for installation of the specimen outdoors.

The present invention is described below in great detail.

The polydiorganosiloxane, component (A), is a silanolterminated polydiorganosiloxane ordinarily used as the main component of silicone sealant compositions. For imparting suitable workability to the composition prior to curing and at the same time excellent mechanical properties to the rubbery elastic product after curing, it is particularly required that the viscosity at 25° C. be in the range of 100 to 200,000 cSt. Where the viscosity is less than 100 cSt, elasticity of the rubbery elastic product after curing is insufficient. When the viscosity exceeds 200,000 cSt, no uniform composition is obtained and workability is also worsened. A particularly preferred viscosity range is 500 to 50,000 cSt at 25° C., in view of well balanced compatibility in properties of the composition prior to and after curing. Examples of the organic groups which are directly bonded to each siloxane unit include alkyl groups including ethyl, propyl, butyl, hexyl, etc.; alkenyl groups such as vinyl, allyl, etc.; aryl groups such as phenyl, etc.; aralkyl groups such as $\beta$-phenylethyl, $\beta$-phenylpropyl, etc.; and monovalent substituted hydrocarbon groups such as 3,3,3-trifluoropropyl, chloromethyl, $\beta$-cyanoethyl, etc. In view of ease of synthesis, monovalent hydrocarbon groups such as methyl, vinyl or phenyl are generally advantageous. Among them, methyl is preferred. It is also preferred that more than 85% of the total organic substituents are methyl, since intermediates containing methyl in the raw materials can be obtained in the easiest way, give the lowest viscosity for the polymerization degree of siloxane and provide advantageous extrusion workability of the composition prior to curing and balance in physical properties of the rubbery elastic product after curing. It is further preferred that substantially all of the organic substituents are methyl.

Component (B) is a polymer which is blocked with hydrolyzable silyl groups at the molecular chain terminals thereof and obtained by reacting:

(a) an epoxy-terminated polyether represented by general formula:

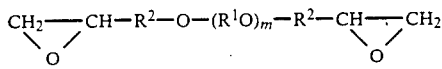

wherein $R^1$ and $R^2$ each represents a divalent hydrocarbon group and m represents a number of 10 to 500;

(b)(i) a heterocyclic compound containing two imino groups bonded to different two carbon atoms in the molecule thereof, and/or;

(ii) an aromatic compound or a heterocyclic compound containing two mercapto groups bonded to carbon atoms constituting the aromatic ring or hetero ring; and, (c) an organosilicon compound containing an epoxy group and a hydrolyzable group.

The epoxy-terminated polyether (a) is the essential component for attaining the durable anti-staining effect which is characteristic of the present invention. The polyether is represented by general formula:

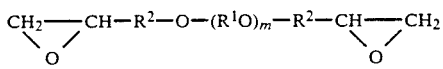

wherein $R^1$ and $R^2$ each represents a divalent hydrocarbon group and m represents a number of 10 to 500.

In the polyether described above, the oxyalkylene unit represented by $R^1O$ has a potent anti-staining effect and therefore, it is preferred to use an oxyethylene unit, an oxypropylene unit or the oxyethylene unit and the oxypropylene unit in combination. The polymerization degree m of the oxyalkylene unit is chosen from the range of 10 to 500. When m is smaller than 10, the rubbery elastic product having a sufficient elasticity can be obtained only with difficulty. Conversely when m is larger than 500, the durability of the anti-staining effect characteristic of the present invention decreases.

Examples of the divalent hydrocarbon group shown as $R^2$ include methylene, ethylene, trimethylene, tetramethylene, phenylene, cyclohexylene, groups represented by the formula

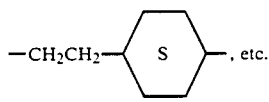

Of these groups, methylene is preferred because of easy access to raw materials.

Representative examples of component (a) are the products obtained by condensing hydroxy-terminated polyoxyethylene or polyoxypropylene with epichlorohydrin in the presence of a basic catalyst.

Compound (b)(i) is a heterocyclic compound containing imino groups capable of reacting with epoxy groups in (a) or (c). The heterocyclic compound should contain in the molecule thereof two imino groups that bond to two different carbon atoms. In view of ease of synthesis and accessibility, examples of compound (b)(i) include the following compounds:

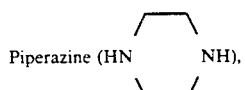

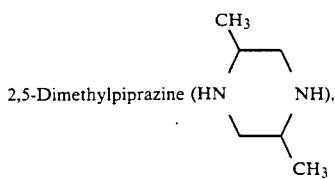

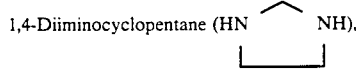

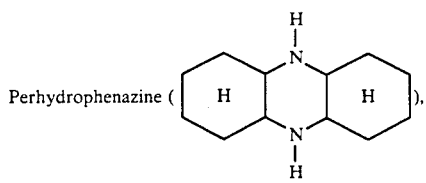

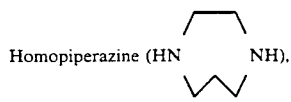

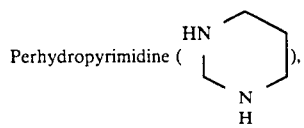

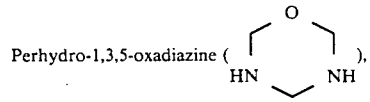

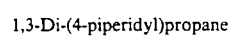

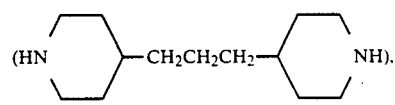

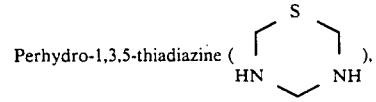

etc. Of these compounds, piprazine is especially recommended because of easy accessibility to raw materials.

Component (b)(ii) is a compound containing in the molecule thereof two mercapto groups that is able to react with the epoxy groups in (a) or (c). For purposes of obtaining the durable anti-staining effect characteristic of the present invention, it is required that the compound (b)(ii) should be an aromatic compound or heterocyclic compound and the mercapto groups described above should bond to the carbon atoms constituting the aromatic ring or hetero ring. As the component (b)(ii), 2,5-dimercapto-1,3,4-thiadiazole, dimercaptobenzene, dimercaptotoluene, dimercaptoxylene, dimercaptonaphthalene, etc. are recommended because of easy accessibility to raw materials and easy synthesis due to the reactivity with epoxy groups and its yield, etc. Of these, 2,5-dimercapto-1,3,4-thiadiazole is particularly preferred on the grounds described above. The components (b)(i) and (b)(ii) may be used singly or in combination.

The organosilicon compound, component (c), contains epoxy groups capable of reacting with the imino groups of (b)(i) and the mercapto groups of (b)(ii) and further contains a hydrolyzable group bonded to a silicon atom.

Preferred examples of these components (c) are compound represented by general formula:

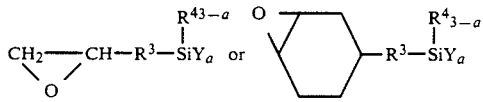

wherein $R^3$ represents the same divalent hydrocarbon group as for $R^2$ and/or a non-hydrolyzable divalent hydrocarbon group shown by the structure obtained by replacing an atom(s) or atomic group(s) of oxygen, nitrogen and sulfur for one or more methylene groups constituting the main chain of the divalent hydrocarbon group described above; $R^4$ represents a monovalent hydrocarbon group; Y represents a hydrolyzable group bonded to the silicon atom; and a represents number of 1 to 3.

$R^3$ represents the same divalent hydrocarbon group as for $R^2$ and a divalent hydrocarbon group obtained by replacing an atom(s) or atomic group(s) of O, N and S for a part of the main chain methylene group of the divalent hydrocarbon group described above, which is, for example, may be represented by general formula:

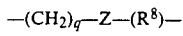

wherein $R^8$ represents the same divalent hydrocarbon group as for $R^2$; Z represents an atom(s) or atomic group(s) of O, N and S; and q represents a number of 1 to 10.

The monovalent hydrocarbon group shown by $R^4$ is selected from the class consisting of alkyl, alkenyl, aryl, aralkyl, and the like. From a viewpoint of easy synthesis or easy accessibility to raw materials, methyl, ethyl, propyl, butyl, pentyl, hexyl, cyclohexyl, vinyl, allyl, phenyl, β-phenethyl, and the like are used. Of these, methyl is particularly preferred in view of easy access to raw materials.

Examples of the hydrolyzable group bonded to a silicon atom which is shown by Y include alkoxy, alkoxyalkoxyl, acyloxy, N, N-dialkylamino, N-alkylamide, N, N-dialkylaminoxy, ketoxime, alkenoxy, etc. In view of easy accessibility, reactivity and non-corrosion property of the hydrolysis product to metals, etc., an alkoxy group having 1 to 6 carbon atoms such as methoxy, ethoxy, propoxy, isopropoxy, hexyloxy, etc. and 2-methoxyethoxy are appropriate. Among them, methoxy and ethoxy, which have a high hydrolytic property (curing reactivity of composition), are preferred, with particular preference being methoxy. The number a of the hydrolyzable group is selected from the range of from 1 to 3 but in order to obtain the rubbery elastic product having a high stretch modulus, is preferably 2.

In component (c), represented by the general formula described above, organosilicon compounds represented by the following general formula:

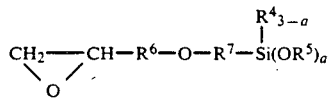

wherein $R^4$ has the same definition as described above; $R^6$ and $R^7$ each represents a divalent hydrocarbon group, $R^5$ represents an alkyl group having 1 to 6 carbon atoms and a has the same definition as described above, are particularly preferred.

Examples of $R^6$ and $R^7$ are the same as those for $R^3$. In view of easy accessibility to raw materials, methylene is preferred as $R^6$. Further as $R^7$, ethylene, trimethylene and tetramethylene are preferred, with particular preference being trimethylene, in view of easy synthesis and easy accessibility to raw materials. The alkoxy group, $R^5O$ and a are as described above. Thus, specific examples of component (c) include β-glycidoxyethyltrimethoxysilane, γ-glycidoxypropyltrimethoxysilane, δ-glycidoxybutyltrimethoxysilane, β-glycidoxyethyltriethoxysilane, β-glycidoxypropyltriethoxysilane, γ-glycidoxybutyltriethoxysilane, methyl (β-glycidoxyethyl) dimethoxysilane, methyl (γ-glycidoxypropyl) dimethoxysilane, methyl (δ-glycidoxybutyl) dimethoxysilane, methyl (β-glycidoxyethyl) diethoxysilane, methyl (γ-glycidoxypropyl) diethoxysilane, methyl (β-glycidoxybutyl) diethoxysilane, phenyl (β-glycidoxyethyl) dimethoxysilane, phenyl (γ-glycidoxypropyl) dimethoxysilane, phenyl (δ-glycidoxybutyl) dimethoxysilane, dimethyl (β-glycidoxyethyl) methoxysilane, dimethyl (γ-glycidoxypropyl) methoxysilane, dimethyl (δ-glycidoxybutyl) methoxysilane, β-(3,4-epoxy cyclohexyl) ethyltrimethoxysilane, β-(3,4-epoxycyclohexyl) ethyltriethoxysilane, methyl-β-(3,4-epoxycyclohexyl) ethyl-dimethoxysilane, phenyl-β-(3,4-epoxycyclohexyl) ethyl-dimethoxysilane, dimethyl-β-(3,4-epoxycyclohexyl) ethyl-methoxysilane, etc.

Component (B) of the present invention is obtained by the reaction of the epoxy groups in components (a) and (c) with the imino groups in component (b)(i) and/or the mercapto groups in component (b)(ii).

Components (a), (c) and (b)(i) and/or (ii) are preferably reacted at a temperature higher than ambient temperature, e.g., at 50 to 150° C. In this case, compounds such as methanol, ethanol, phenol, salicylic acid, tris (dimethylaminomethyl) phenol, benzylmethylamine, tributylamine and 2-methylimidazole, etc. may preferably used as reaction accelerators. Methanol is one of the most preferred accelerators. The reaction may proceed in the absence of any solvent but solvents of hydrocarbon, ether or ester type may also be used.

Components (a), (b) and (c) are used theoretically in a molar ratio of (a) : (b) : (c) = p : (p+1) : 2 (wherein p represents a natural number starting with 1). However, the components (b) and (c) may actually be used in somewhat larger amounts than the theoretical amounts based on component (a).

The order of reacting the components (a), (b) and (c) may be simultaneous. Alternatively, component (a) is firstly reacted with component (b) in an amount larger than the equimolar amount and suited to obtain the polyether within the molecular weight described above, whereby chain extension is effected. Then, component (c) is added in a necessary amount or in an amount somewhat larger than that. The alternative order of reaction is preferred since the polymerization degree can be more easily controlled and the hydrolyzable group can be introduced onto the molecular chain terminals with certainty.

As component (B), the product obtained from (a), (b)(i) and (c) may be used; or the product obtained from (a), (b)(ii) and (c) may be used; or both products may be used in combination.

It is preferred that the components be chosen to have the molecular weight of component (B) within the range of from 1,000 to 50,000. When the molecular weight is less than 1,000, the elongation of the elastomer obtained by curing is short for the elongation required as sealants. Conversely with larger than 50,000, the viscosity becomes high so that workability decreases.

The amount component (B) to be used is preferably in the range of 5 to 100 parts by weight, more preferably in the range of 10 to 80 parts by weight, based on 100 parts by weight of the component (A). When the amount of the component (B) is less than 5 parts by weight, the antistaining effect is not sufficiently exhibited. Conversely with larger than 100 parts by weight, weather resistance, heat resistance and cold resistance of the cured matter are undesirably reduced.

Component (C) of the present invention is a component for imparting suitable non-flowability and reinforcement to the composition of the present invention. Examples of component (C) include fumed silica, precipitated silica, crushed quartz, diatomaceous earth, calcium carbonate, titanium oxide, alumina, aluminum hydroxide, iron oxide, talc, clay, carbon black, etc. These inorganic fillers may also be used by subjecting them to surface treatment with fatty acids or organosilicon compounds, for example, trimethylchlorosilane, hexamethyldisilazane, hexamethylcyclotrisiloxane, oxtamethylcyclotetrasiloxane and silicone oil, etc.

The amount of the component (C) to be used is within 3 to 300 parts by weight, preferably 5 to 200 parts by weight, based on 100 parts by weight of the components (A) and (B) in total. When the amount of the component (C) is less than 3 parts by weight, non-flowability and reinforcement cannot be achieved. With larger than 300 parts by weight, the viscosity of the composition becomes high so that workability is reduced.

Examples of the curing catalyst, component (D), which can be used in the present invention include tin carboxylates such as tin octylate, etc.; organic tin carboxylates such as dibutyl tin dilaurate, dibutyl tin dimaleate, dibutyl tin phthalate, etc.; the reaction products of organic tin oxides and esters thereof; organic titanic acid esters such as tetrabutyl titanate, etc.; amines; amine salts; quaternary ammonium salts; guanidine compounds, etc. These curing catalysts are used preferably in the range of from 0.001 to 20 parts by weight based on 100 parts by weight of the components (A) and (B) in total. When the amount of component (D) is less than the lower limit, the curing rate is so slow that the composition is not suited for use. Conversely when the amount is larger than the upper limit, it is not only meaningless but there is a danger that might cause undesired exudation or deposition.

The composition of the present invention may also contain hydrolyzable silanes. Examples of the hydrolyzable silanes include γ-aminopropyltrimethoxysilane shown by $H_2N(CH_2)_3Si(OCH_3)_3$, γ-aminopropyltirethoxysilane shown by $H_2N(CH_2)_3Si(OCH_2CH_3)_3$, N-(β-aminoethyl)-γ-aminopropyltrimethoxysilane shown by $H_2N(CH_2)_2NH(CH_2)_3Si(OCH_3)_3$, γ-methacryloxypropyltriethoxysilane shown by $$CH_2=C(CH_3)-C(=O)-O-(CH_2)_3-Si(OCH_2CH_3)_3.$$

vinyltriethoxysilane shown by $CH_2=CHSi(OCH_2CH_3)_3$, dimethyldimethoxysilane shown by $(CH_3)_2Si(OCH_3)_2$, methyltrimethoxysilane shown by $CH_3Si(OCH_3)_3$, methyltriethoxysilane shown by $CH_3Si(OCH_2CH_3)_3$, tetraethoxysilane shown by $Si(OCH_2CH_3)_4$, etc. Those products obtained by partially hydrolyzing or polymerizing these silanes may also be used.

Furthermore, the composition of the present invention may also appropriately contain thixotropicity imparting agents such as hydrogenated castor oil, etc.; plasticizers such as dioctyl phthalate, butylbenzyl phthalate, chlorinated paraffin, etc., UV absorbents such as benzotriazole or phenol type, antioxidants, etc.

The composition of the present invention is generally stored in a two-package form by separately packaging the components (A) and (B) and appropriately mixing the other components with either (A) or (B) and is used by mixing the both prior to use. It is particularly preferred that the components (C) and (A) are packaged in the same package and other compounds are packaged together with the component (B), in view of stability during storage and workability.

The composition of the present invention is suited for sealants for construction. Even in the case of using the composition in joint sealing of outer walls in buildings, the composition does not stain the periphery of the joints. Since the anti-staining property can be retained over long periods of time, the beautiful appearance of architecture can be maintained forever.

Hereafter the present invention is described by referring to the examples below. In the examples and comparative examples, parts and % are all by weight.

SYNTHESIS EXAMPLES 1 TO 3

Synthesis Example 1

To 5 moles [10 (epoxy) equivalents] of glycidyl-terminated polyoxypropylene having a mean polymerization degree of 15, a molecular weight of about 10,000 and a viscosity at 25° C. of 270 cSt were added 6 moles of piperazine shown by

and methanol in an amount corresponding to 10% of polyoxypropylene. In a nitrogen flow, stirring was initiated while heating at 60° C. A part of the mixture was withdrawn every four hours from the initiation of stirring with heating to observe the peak (2.67 ppm using tetramethylsilane as the standard) of epoxide-methylene with proton in NMR, quantitatively determine the imino groups by the potential difference titration method and measure the viscosity at 25° C. Twelve hours after the initiation of the stirring with heating, the peak of epoxide-methylene with proton disappeared and the viscosity of the mixture which was 80 cSt before the stirring with heating reached 1,500 cSt. Thus, 2.2 moles of methyl (γ-glycidoxypropyl) dimethoxysilane shown by

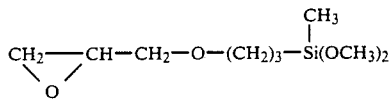

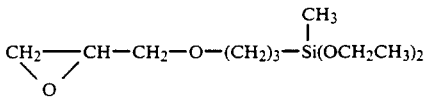

was added to the mixture followed by stirring with heating under the same conditions. A part of the reaction mixture was withdrawn every 4 hours after the addition of the silane described above to quantitatively trace the imino groups in the sample by the potential difference titration method. The imino groups were not detected 16 hours after the addition of the silane. Thus, the stirring with heating was completed and methanol was distilled off. The resulting reaction, product in which disappearance of the peak of epoxide-methylene with proton by NMR was noted was a light yellow viscous liquid having a viscosity at 25° C. of 15,000 cSt, a specific gravity at the same temperature of 1.01 and a mean number molecular weight of 6,000 when measured by GPC. It was confirmed that the product was a polyether (P—1), the molecular chain terminals of which were blocked with a hydrolyzable silyl group represented by the following formula:

was added to the mixture followed by stirring with heating under the same conditions. A part of the reaction mixture was withdrawn every 2 hours after the addition of silane described above to quantitatively determine the imino groups in the sample by the potential difference titration method and observe the peak of epoxide-methylene with proton by NMR. The imino groups and the peak almost disappeared 8 hours after the addition of the silane. Thus, the stirring with heating was completed and ethanol was distilled off to give a light yellow viscous liquid having a viscosity at 25° C. of 26,000 cSt, a specific gravity at the same temperature of 1.01 and a mean number molecular weight of 11,000 when measured by GPC (polyether P—2, the molecular chain terminals of which were blocked with a hydrolyzable silyl group represented by the following formula):

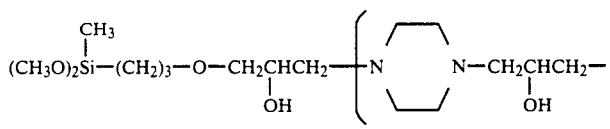

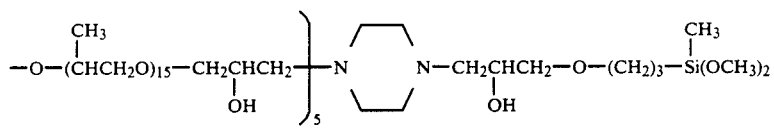

Synthesis Example 2

To 5 moles [10 (epoxy) equivalents] of glycidyl-terminaed polyoxypropylene having a mean polymerization degree of 32, a molecular weight of about 2,000 and a viscosity at 25° C. of 550 cSt were added 6 moles of piperazine shown by

and ethanol in an amount corresponding to 10% of polyoxypropylene. In a nitrogen flow, stirring was initiated while heating at 80° C. A part of the mixture was withdrawn every two hours from the initiation of stirring with heating to observe the peak of epoxide-methylene with proton in NMR, quantitatively determine the imino groups by the potential difference titration method and measure the viscosity at 25° C. Six hours after the initiation of the stirring with heating, the titre decreased by almost the theoretical amount and the peak of epoxide-methylene with proton disappeared. The viscosity of the mixture which was 210 cSt before the stirring with heating reached 4,000 cSt. Thus, 2.2 mols of

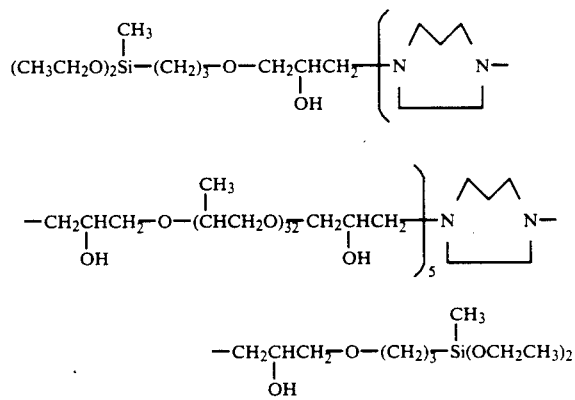

Synthesis Example 3

To 3 moles [6 (epoxy) equivalents] of glycidyl-terminated polyoxyethylene-poolyoxypropylene copolymer shown by a mean molecular formula in the backbone:

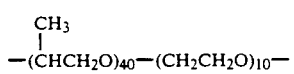

and having a molecular weight of about 3,000 and a viscosity at 25° C. of 1010 cSt were added 4 moles of 2,5-dimercapto-1,3,4-thiadiazole shown by:

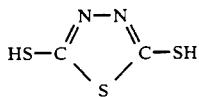

and methanol in an amount corresponding to polymer described above. In a nitrogen flow, stirring was initiated while heating at 60° C. A part of the mixture was withdrawn every four hours from the initiation of stirring with heating to observe the peak (2.67 ppm using tetramethylsilane as the standard) of epoxide-methylene with proton in NMR and measure the viscosity at 25° C. Twelve hours after the initiation of the stirring with heating, the peak of epoxide-methylene with proton disappeared and the viscosity of the mixture which was 390 cSt before the stirring with heating reached 5,200 cSt. Thus, 2.2 mols of methyl (γ-glycidoxypropyl)-dimethoxysilane shown by:

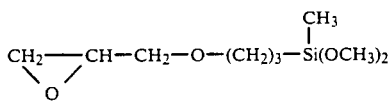

were added to the mixture followed by stirring with heating under the same conditions. A part of the reaction mixture was withdrawn every 4 hours after the silane described above and iodine was added thereto. By reacting with the mercapto groups and conducting back titration of the remaining iodine with sodium thiosulfate, the mercapto groups were detected. The mercapto groups were not detected 12 hours after the addition of the silane. Thus, the stirring with heating was completed and methanol was distilled off. The resulting reaction product was a light yellow viscous liquid having a viscosity at 25° C. of 23,000 cSt, a specific gravity at the same temperature of 1.01 and a mean number molecular weight of 9,900 when measured by GPC. It was confirmed that the product was a polyether (−3), the molecular chain terminals of which were blocked with a hydrolyzable silyl group represented by the following formula:

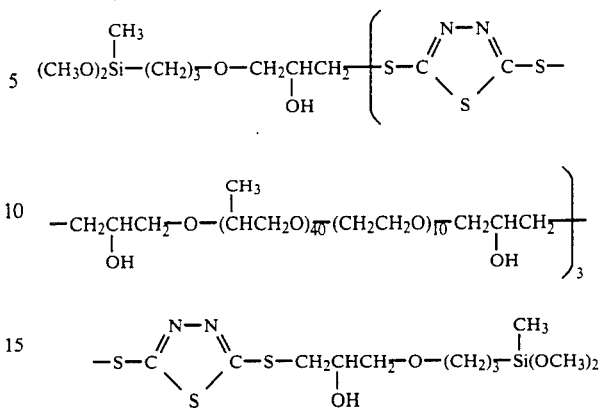

EXAMPLES 1 TO 5 AND COMPARISON EXAMPLES 1 TO 3

To 100 parts of silanol-terminated polydiorganosiloxane having a viscosity at 25° C. of 5,000 cSt were added 50 parts of heavy calcium carbonate having a mean grain diameter of 1μ, 50 parts of stearic acid-treated colloidal calcium carbonate having a mean grain diameter of 0.05μ and 3 parts of hydrogenated castor oil. The mixture was kneaded with a kneader to give base compound (B-1). P−1 through P−3 synthesized in Synthesis Examples 1 to 3, a hydrolyzable silicon compound and a curing catalyst were mixed with this base compound in the amounts shown in Table 1 to prepare Sample Nos. 11 through 18. Then, using these samples, test specimen 3 shown in FIG. 1 was prepared. That is, two white enamel plates 1 and 1 each having a width of 200 mm were adhered to each other with Sample No.2. The adhered area was 20mm×400mm. After the test specimen was cured to harden at normal temperature for 2 weeks, the specimen was installed in the outdoor for exposure. That is, the specimen 3 prepared as described above was mounted onto a plate 4 inclined to 60° in such a way that the joints were horizontal. The longer edge of the specimen was apart by 300 mm from the ground 5. Six months and 12 months after the exposure, the degree of staining at the peripheries of the joints was determined by reading its value with the Munsell system. The results are also shown in Table 1.

In Comparison Example 1, the polymer obtained from the polyether was not used. In Comparison Examples 2 and 3, surface active agents were added instead of the polymer obtained from the polyether.

TABLE 1

| | Example 1 | Example 2 | Example 3 | Example 4 | Example 5 | Comp. Example 1 | Comp. Example 2 | Comp. Example 3 |
|---|---|---|---|---|---|---|---|---|
| Sample No. | 11 | 12 | 13 | 14 | 15 | 16 | 17 | 18 |
| B-1 (part) | 100 | 100 | 100 | 100 | 100 | 100 | 100 | 100 |
| P-1 (part) | 10 | 25 | 35 | — | — | — | — | — |
| P-2 (part) | — | — | — | 20 | — | — | — | — |
| P-3 (part) | — | — | — | — | 25 | — | — | — |
| $Si(OC_2H_5)_4$ (part) | 1 | — | — | — | — | 3 | 3 | 3 |
| Dibutyl tin dilaurate (part) | 1 | 1 | 1 | 1 | 1 | 1 | 1 | 1 |
| Polyethylene sorbitan monolaurate (part) | — | — | — | — | — | — | 10 | — |
| $C_3F_7CONH(CH_2)_3N^{\oplus}(CH_3)_2$ \| $CH_2CH_2COO^{\ominus}$ (part) | — | — | — | — | — | — | — | 10 |

TABLE 1-continued

|  | Example 1 | Example 2 | Example 3 | Example 4 | Example 5 | Comp. Example 1 | Comp. Example 2 | Comp. Example 3 |
|---|---|---|---|---|---|---|---|---|
| Stained state (numerals indicate values by the Munsell system): | | | | | | | | |
| Initial stage: | | | | | | | | |
| 5 cm above joint | 9.5 | 9.5 | 9.5 | 9.5 | 9.5 | 9.5 | 9.5 | 9.5 |
| 2 cm above joint | 9.5 | 9.5 | 9.5 | 9.5 | 9.5 | 9.5 | 9.5 | 9.5 |
| 2 cm below joint | 9.5 | 9.5 | 9.5 | 9.5 | 9.5 | 9.5 | 9.5 | 9.5 |
| 5 cm below joint | 9.5 | 9.5 | 9.5 | 9.5 | 9.5 | 9.5 | 9.5 | 9.5 |
| 6 Months after exposure in the outdoor: | | | | | | | | |
| 5 cm above joint | 9.0 | 9.0 | 9.0 | 9.0 | 9.0 | 5.0 | 7.0 | 9.0 |
| 2 cm above joint | 8.0 | 9.0 | 8.5 | 9.0 | 8.5 | 4.0 | 6.5 | 8.0 |
| 2 cm below joint | 8.0 | 8.5 | 8.5 | 8.5 | 8.5 | 4.0 | 6.0 | 8.0 |
| 5 cm below joint | 8.0 | 9.0 | 9.0 | 8.5 | 8.5 | 4.5 | 6.0 | 8.5 |
| 12 Months after exposure in the outdoor: | | | | | | | | |
| 5 cm above joint | 8.5 | 9.0 | 9.0 | 8.5 | 8.5 | 4.0 | 4.0 | 5.5 |
| 2 cm above joint | 8.0 | 8.5 | 8.5 | 8.5 | 8.5 | 4.0 | 4.0 | 5.5 |
| 2 cm below joint | 8.0 | 8.5 | 8.5 | 8.5 | 8.5 | 4.0 | 4.0 | 5.0 |
| 5 cm below joint | 8.0 | 8.5 | 8.5 | 8.5 | 8.5 | 4.0 | 4.0 | 5.0 |

EXAMPLES 6 TO 10 AND COMPARISON EXAMPLES 4 AND 5

To 100 parts of silanol-terminated polydiorganosiloxane having a viscosity at 25° C. of 10,000 cSt were added 50 parts of stearic acid-treated light calcium carbonate having a 5 mean grain diameter of 2.5μ, 50 parts of stearic acid-treated colloidal calcium carbonate having a mean grain diameter of 0.07μ and 3 parts of hydrogenated caster oil. The mixture was kneaded with a kneader to give base compound (B-2). P−1 through P−3 synthesized in Synthesis Examples 1 to 3, a hydrolyzable silicon compound and a curing catalyst were mixed with this base compound in the amounts shown in Table 2 to prepare Sample Nos. 21 through 27. Using these samples, the test was performed in a manner similar to EXAMPLES 1 to 5. The results are also shown in Table 2.

In Comparison Example 4, the polymer obtained from the polyether was not used. In Comparison Example 5, a surface active agent was added instead of the polymer obtained from the polyether.

TABLE 2

|  | Example 6 | Example 7 | Example 8 | Example 9 | Comp. Example 10 | Comp. Example 4 | Comp. Example 5 |
|---|---|---|---|---|---|---|---|
| Sample No. | 21 | 22 | 23 | 24 | 25 | 26 | 27 |
| B-2 (part) | 100 | 100 | 100 | 100 | 100 | 100 | 100 |
| P-1 (part) | 10 | 25 | 35 | — | — | — | — |
| P-2 (part) | — | — | — | 20 | — | — | — |
| P-3 (part) | — | — | — | — | 25 | — | — |
| $CH_3Si(OC_2H_5)_3$ (part) | 1 | — | — | — | — | 3 | 3 |
| Dibutyl tin dilaurate (part) | 1 | 1 | 1 | 1 | 1 | 1 | 1 |
| Polyethylene sorbitan monolaurate (part) | — | — | — | — | — | — | 10 |
| Stained state (numerals indicate values by the Munsell system): | | | | | | | |
| Initial state: | | | | | | | |
| 5 cm above joint | 9.5 | 9.5 | 9.5 | 9.5 | 9.5 | 9.5 | 9.5 |
| 2 cm above joint | 9.5 | 9.5 | 9.5 | 9.5 | 9.5 | 9.5 | 9.5 |
| 2 cm below joint | 9.5 | 9.5 | 9.5 | 9.5 | 9.5 | 9.5 | 9.5 |
| 5 cm below joint | 9.5 | 9.5 | 9.5 | 9.5 | 9.5 | 9.5 | 9.5 |
| 6 Months after exposure in the outdoor: | | | | | | | |
| 5 cm above joint | 8.5 | 9.0 | 9.0 | 9.0 | 9.0 | 6.5 | 4.5 |
| 2 cm above joint | 8.0 | 8.5 | 9.0 | 8.5 | 8.5 | 6.0 | 4.0 |
| 2 cm below joint | 8.0 | 8.5 | 9.0 | 8.5 | 8.5 | 6.0 | 4.0 |
| 5 cm below joint | 8.0 | 9.0 | 9.0 | 8.5 | 8.5 | 6.0 | 4.0 |
| 12 Months after exposure in the outdoor: | | | | | | | |
| 5 cm above joint | 8.0 | 9.0 | 9.0 | 9.0 | 8.5 | 4.0 | 4.0 |
| 2 cm above joint | 8.0 | 8.5 | 9.0 | 8.5 | 8.5 | 4.0 | 4.0 |
| 2 cm below joint | 7.5 | 8.5 | 8.5 | 8.5 | 8.5 | 4.0 | 4.0 |
| 5 cm below joint | 8.0 | 9.0 | 9.0 | 8.5 | 8.5 | 4.0 | 4.0 |

EXAMPLES 11 AND 12 AND COMPARISON EXAMPLE 6

Sample No. 13 used in Example 3, Sample No. 23 used in Example 8 and Sample No. 26 used in Comparison Example 4 were used as joint sealants for a building with a precast concrete, to the surface of which a burner-finished granite had been adhered, as the outer wall. Nine months after the laying, the staining state at the peripheries of the joints were observed.

The results are shown in Table 3.

TABLE 3

|  | Example 11 | Example 12 | Comparison Example 6 |
|---|---|---|---|
| Sample No. | 13 | 23 | 26 |
| Place laid | Third floor, Southern side | Second floor, Eastern side | Third floor, Eastern side |
| Results of | No staining | No staining | The peripheries of the |

TABLE 3-continued

|  | Example 11 | Example 12 | Comparison Example 6 |
|---|---|---|---|
| observation | was noted. | was noted. | joints were stained to grey at areas of from 2 to 5 cm. The stained portions show water repellency. |

While the invention has been described in detail and with reference to specific embodiments thereof, it is apparent to one skilled in the art that various changes and modifications can be made therein without departing from the spirit and the scope of the present invention.

What is claimed is:

1. A room temperature curing composition comprising:
   (A) 100 parts by weight of a silanol terminaed polydiorganosiloxane having a viscosity of 25° C. of 100 to 200,000 cSt;
   (B) 5 to 100 parts by weight of a hydrolyzable silyl-terminated polymer obtained by reacting:
      (a) an epoxy-terminated polyether represented by general formula:

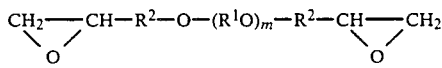

wherein $R^1$ and $R^2$ each represents a divalent hydrocarbon group and m represents a number of 10 to 500;
      (b)(i) a hetrocyclic compound containing two imino groups bonded to two different carbon atoms in the molecule thereof, and/or; (ii) an aromatic compound or a heterocyclic compound containing two mercapto groups bonded to carbon atoms constituting the aromatic ring or hetero ring; and,
      (c) an organosilicon compound containing an epoxy group and a hydrolyzable group;
   (C) 3 to 300 parts by weight of an inorganic filler based on 100 parts by weight of (A) and (B) in total; and,
   (D) 0.001 to 20 parts by weight of a curing catalyst based on 100 parts by weight of (A) and (B) in total, said catalyst being selected from the group consisting of organic tin carboxylates, the reaction products of organic tin oxides and esters thereof, organic titanic esters, amines, amine salts, quaternary ammonium salts and guanidine compounds.

2. A composition as claimed in claim 1, wherein said component (b)(i) is a heterocyclic compound selected from piperazine, 2,5-dimethylpiperazine, 1,4-diiminocyclopentane, perhydrophenazine, homopiperazine or perhydro-1,3,5-oxadiazine.

3. A composition as claimed in claim 1, wherein said component (b)(ii) is an aromatic compound or heterocyclic compound selected from 2,5-dimercapto-1,3,4-thiadiazole, dimercaptotoluene, dimercaptoxylene or dimercaptonaphthalene.

4. A composition as claimed in claim 1, wherein said component (c) is an organosilicon compound containing an epoxy group and a hydrolyzable group bonded to the silicon atom, represented by general formula:

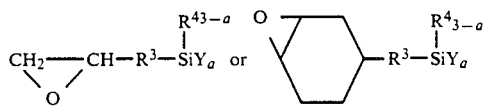

where $R^3$ represents a divalent hydrocarbon group and/or a non-hydrolyzable divalent hydrocarbon group of the formula:

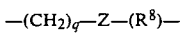

wherein $R^8$ represents the same divalent hydrocarbon group as for $R^2$; z represents an atom or an atomic group of O, N or S; and q represents a number of 1 to 10; $R^4$ represents a monovalent hydrocarbon group; Y represents a hydrolyzable group bonded to the silicon atom; and a represents a number of 1 to 3.

5. A composition as claimed in claim 1, wherein said component (c) is an organosilicon compound represented by general formula:

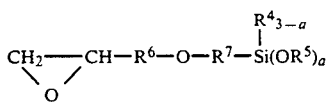

wherein $R^4$ represents a monovalent hydrocarbon group; $R^{67}$ and $R^7$ each represents a divalent hydrocarbon group, $R^5$ represents an alkyl group having 1 to 6 carbon atoms and a represents a number of 1 to 3.

* * * * *